(12) United States Patent
Vohra (10) Patent No.: US 7,559,994 B2
(45) Date of Patent: Jul. 14, 2009

(54) DEVICE AND PROCESS FOR CLEANING ELECTRIFIED CONTACT RAIL INSULATORS FOR RAIL RAPID TRANSIT SYSTEMS

(76) Inventor: Arun Vohra, 7710 Bradley Blvd., Bethesda, MD (US) 20817

( * ) Notice: Subject to any disclaimer, the term of this patent is extended or adjusted under 35 U.S.C. 154(b) by 375 days.

(21) Appl. No.: 11/603,019

(22) Filed: Nov. 22, 2006

(65) Prior Publication Data

US 2007/0062556 A1    Mar. 22, 2007

Related U.S. Application Data

(62) Division of application No. 10/862,390, filed on Jun. 8, 2004.

(51) Int. Cl.
*B08B 7/04* (2006.01)
*A46B 13/06* (2006.01)
(52) U.S. Cl. .............................. 134/6; 134/42; 15/88.2; 15/21.1
(58) Field of Classification Search ............... 134/6, 134/42; 15/88.1, 88.2, 88.4, 21.1
See application file for complete search history.

(56) References Cited

U.S. PATENT DOCUMENTS

| 2,851,716 | A | * | 9/1958 | Becker et al. | ............... 15/312.1 |
| 3,457,574 | A | * | 7/1969 | Hirt | ........................... 15/88.4 |
| 4,771,499 | A | * | 9/1988 | Fusi et al. | ........................ 15/88 |
| 5,119,851 | A | * | 6/1992 | Paris | ........................... 134/172 |

FOREIGN PATENT DOCUMENTS

JP     360161229     *   8/1985
JP     406270779     *   9/1994

* cited by examiner

*Primary Examiner*—Michael Barr
*Assistant Examiner*—Saeed T Chaudhry (57) ABSTRACT

A process for cleaning electrical insulators supporting a contact rail parallel to a rail track comprises moving a vehicle having cleaning stations with cleaning tools (such as water jets) mounted on them, along a rail track adjacent to a parallel contact rail supported by electrical insulators, said cleaning stations being mounted on a positioning arm(s); positioning cleaning tools in proximity to an electrical insulator, while the cleaning stations rotate around at least a portion of the circumference of the insulator; energizing the cleaning tools; disengaging the cleaning tools from the insulator; and returning the cleaning station to the engagement position.

20 Claims, 10 Drawing Sheets

DEVICE AND PROCESS FOR CLEANING ELECTRIFIED CONTACT RAIL INSULATORS FOR RAIL RAPID TRANSIT SYSTEMS

CROSS REFERENCE TO RELATED APPLICATION

This application is a divisional patent application of application Ser. No. 10/862,390 filed Jun. 08, 2004 by Arun Vohra for Device and Process for Cleaning Contact Rail Insulators For Rail Rapid Transit Systems.

BACKGROUND OF THE INVENTION

The invention relates to a device and process for cleaning electrified contact (or third) rail insulators for rail rapid transit systems to prevent arcing and smoke. There may be one or two contact rails. The contact rail typically carries over 700 volts and sits on porcelain or fiberglass composite insulators. The contact rail often has a safety cover that limits access to the insulators. Anchors, brackets and cables also limit access to the insulators. Cleaning with hand brushes, cleaning pads, or pressure washing (and blow drying with compressed air to prevent wet surfaces from conducting electricity) is slow, costly, and not fully effective.

The problem is that electrically conducting particulates and dirt adhere to the insulators. Normal maintenance of the tracks includes rail grinding that generates a significant amount of iron particulates that coat the insulators. Rust and brake shoe particles also coat the insulators. Snow and highway deicing salt can be thrown by snow plows from a highway running next to the track, or salted snow can melt and the salt water can drip down from a road above the track, and coat the insulators. Sea water can drip into a rail tunnel under the sea and the salt can coat and short out the insulators. The insulators eventually fail and arc, producing smoke and flame. If the insulator is made of fiberglass, it can burn. Porcelain insulators can become red hot and melt. The hot insulators can cause wood ties to catch on fire. The reduced support to the running rails due to a burnt out tie, may cause a derailment of the railcar and train with catastrophic results. The contact rail cover guard is typically made of fiberglass, and it can also burn. A failed insulator can cause the electric supply cable to overheat and cause the plastic cable covering to smoke and burn. When there is a smell of smoke, the system may have to be shut down until an investigation shows that there is no danger of fire. Note that a 10-minute smoke incident delay on one track can tie down much of an entire city rail transit network for 40 minutes or more.

When smoke is reported or arcing is seen, the policy of one transit authority was to stop rail traffic. The local Fire Department was called. It inspected the location where smoke was reported. If an arcing insulator was discovered, it was removed immediately with a sledgehammer and replaced at night when the system was closed to the public. The loss of income to the rail system and lost time for the passengers was substantial. Rail transit systems routinely replace thousands of burnt out insulators every year at considerable cost. Cleaning insulators is especially difficult and costly inside tunnels where there is no rain to wash away dust and nowhere for combustible debris and smoke to go.

Some transit systems and their electric switchgear are so old that it is difficult to turn the power back on after turning it off. It would be advantageous to clean the insulators with the power on. If the electricity is not cut off, tap water cannot be used for cleaning the insulators because of the danger of electric shorts. Also, harsh and abrasive cleaners and cleaning media cannot be used as they may damage the ceramic or fiberglass composite insulators, or cause corrosion and malfunction of switches, sensors, and metal components. Most jurisdictions ban the use of cleaning chemicals because of environmental and health concerns.

The insulator cleaning device of the invention is attached to a service vehicle that travels on the tracks and quickly cleans the insulators as it goes along. The insulator cleaning device will improve the safety and security of the rail rapid transit system. After the recent attacks on the Pentagon and the World Trade Center, people are concerned about their safety. Smoke and electric arcing from dirty insulators and delays in dark tunnels may cause fear and scare people away from using rail rapid transit. Diversion to personal modes of transport will cause traffic jams and delays, and hurt economic development. The cleaning device of the invention will enhance the public perception of a safe and secure rail transit system and support economic development.

SUMMARY OF THE INVENTION

The invention relates to a cleaning device and process for fast, low-cost cleaning of contact rail insulators on rail rapid transit systems.

1. A device for cleaning contact rail insulators is provided, comprising a cleaning station with one or more fingers having cleaning tools, said fingers extending from the cleaning station so as to bring said cleaning tools within operative proximity to an insulator of an adjacent contact rail, said cleaning station being mounted on a positioning arm attached to a vehicle that travels on rails so that the finger(s) of the cleaning station engage, rotate around, and disengage from an insulator of the adjacent contact rail as the vehicle passes by the insulator.

The device may include means for controlling said one or more fingers so that they engage the insulator, move around a portion of the circumference of the insulator, disengage from the insulator, and return to the position to engage another insulator, such as mechanical linkages and fluid, electronic, or electromagnetic actuators. These means may themselves be controlled by a mechanical lever or button, proximity switch, photo electric beam, infrared camera that senses heat from a dirty insulator, a laser or laser scanner, acoustic, sonic, ultrasonic detector, capacitance or inductance detector, human operator or other sensing means. Cleaning power to the cleaning tools can be continuous or automatically or manually switched on and off Automatic switching can be provided by a mechanical switch; lever or button triggered by movement of the finger(s) or contact with the insulator, or by said sensing means.

The fingers of the cleaning station are connected to the positioning arm, directly or by an intermediate member, by a hinge or pin so that when they contact the insulator, and the positioning arm moves forward, they cause the cleaning station to rotate around the circumference of the insulator or a portion of the circumference, so that the cleaning tools can operate on the entire circumference of the insulator. In order to clean the entire surface of an insulator, the cleaning station will rotate around approximately one-half of the circumference of the insulator, depending on the geometry of the positioning arm and what type of cleaning tools are used. The positioning arm is preferably an articulated arm, i.e., an arm comprised of at least two members linked by a hinge or pin.

Cleaning tools may include powered rotating, reciprocating, vibrating, oscillating and/or linear brushes, wrap around cleaning belts, and/or linear brushes that move, sonic horns (low frequency, high amplitude noise,) ultrasonic energy, laser or laser scanners, steam cleaning nozzles, high pressure and temperature washing and/or water jetting nozzles attached to stationary, rotating or oscillating spray bars and spinning heads using steam, tap or deionized water with or without an appropriate abrasive cleaning medium, and pneumatic polishing nozzles (a modified form of air blast cleaning that uses cleaning media at a low velocity).

Preferably, the device of the invention will include a vertical positioning means to keep the cleaning station in the same plane as the insulators. Such vertical positioning means may comprise a skate that slides or has rollers that ride on top of the contact rail to which the insulators are attached, and vertically positions the cleaning station.

2. The process of the invention includes
   (a) moving a vehicle having one or more cleaning stations with cleaning tools mounted on them, along a rail track adjacent to a parallel contact rail supported by electrical insulators, said cleaning stations being mounted on one or more positioning arms attached to said vehicle,
   (b) placing said cleaning tools in operative proximity to an electrical insulator supporting said contact rail, while the cleaning station(s) rotate around at least a portion of the circumference of the insulator,
   (c) energizing the cleaning tools when they are at the operative proximity with the insulator,
   (d) disengaging the cleaning tools from the insulator, and
   (e) returning the cleaning station to the engagement position.

BRIEF DESCRIPTION OF THE DRAWINGS

FIG. 5 is a top view of the service vehicle 24 that rides on the running rails 16.

DETAILED DESCRIPTION OF THE DRAWINGS

Figure 1:
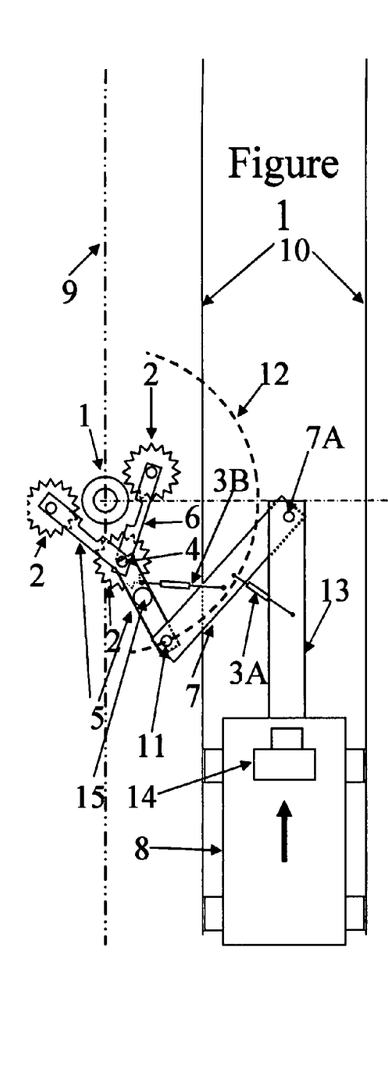
FIG. 1 shows a top view of the articulated positioning arm ready to engage the insulator 1, as it approaches said insulator.
Figure 2:
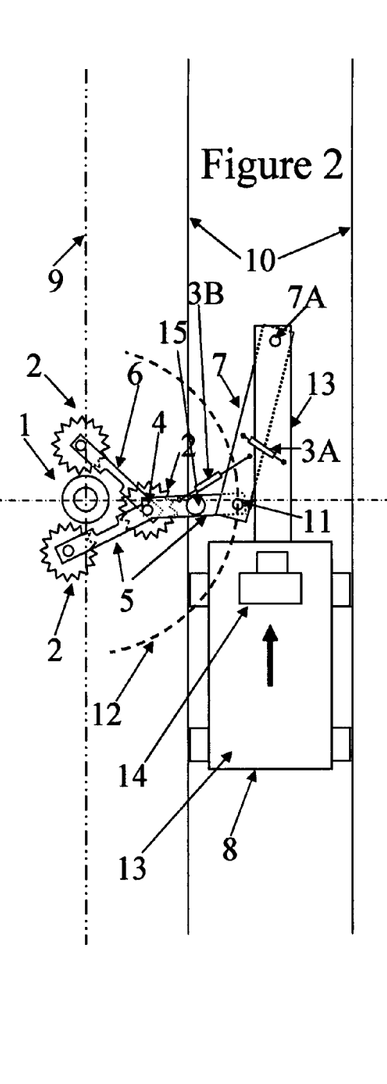
FIG. 2 is a top view showing the fingers embracing the insulator, and rotated about 90 degrees around said insulator by said positioning arm.
Figure 3:
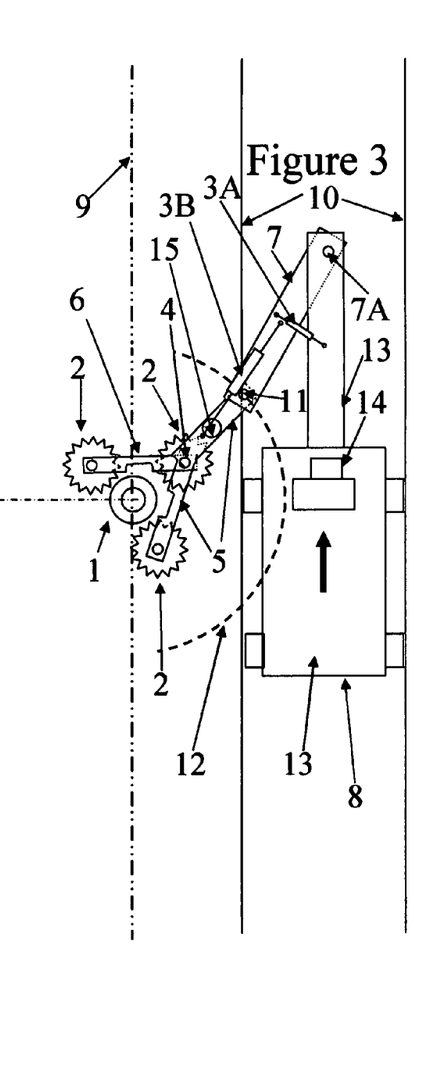
FIG. 3 is a top view showing the cleaning station after revolving approximately 180 degrees around the insulator as the service vehicle 8 moves forward.

FIGS. 1, 2 and 3, show a top view of one embodiment of the cleaning device. The cleaning station is comprised of member 5 connected to movable finger 6 by means of hinge 4. The end of member 5 on which a cleaning tool is mounted acts as a finger that is fixed with regard to the cleaning station. Said cleaning station can have several cleaning tools 2 such as stationary high pressure water jets or spray bars, spinning high pressure water jet nozzles or spray bars, pneumatic polishing nozzles (a modified form of blast cleaning) and/or spinning brushes located at various points around the insulator. Said cleaning station is attached to the service vehicle 8 by the articulated arm members 5 and 7. Said member 7 is attached by hinge 7A to member 13. Said member 13 is fixed to said service vehicle. The bold arrow represents the direction of travel of the service vehicle. Actuators 3A and 3B control the angular movement of said articulated arm and positioning of said cleaning station respectively. Said station is shown in three positions which the device occupies during the course of cleaning the insulator 1. The running rails 10 carry the service vehicle 8 and the insulator 1 supports the contact rail 9. The rotational path taken by the pivot point 11 where the two members of the articulated arm 5 and 7 meet is shown by the circular line 12. Said service vehicle contains a pressure washer, an engine driven or contact rail powered electric power source and an engine driven fluid compressor 14 connected to the cleaning tools. Said cleaning station can also have a fluid or electric motor or internal combustion engine 15 mounted on member 5, connected to cleaning tools 2 by means of chain, belt, fixed or flexible shaft drives.

FIG. 1 shows a top view of the articulated positioning arm comprised of members 5 and 7 that are connected by means of hinge 11 and movable finger 6 in the open position, ready to engage the insulator 1, as it approaches said insulator. As shown in this figure, the cleaning station may be comprised of one end of the positioning arm, a moveable finger, and the connection between them. Alternatively, the cleaning station could be comprised of the end of the positioning arm with cleaning tools mounted thereon.

FIG. 2 is a top view showing the fingers embracing the insulator, and rotated about 90 degrees around said insulator by said positioning arm.

FIG. 3 is a top view showing the cleaning station after revolving approximately 180 degrees around the insulator as the service vehicle 8 moves the articulated arm 7 forward. The fingers 5 and 6 are disengaging and releasing the insulator.

Figure 4:
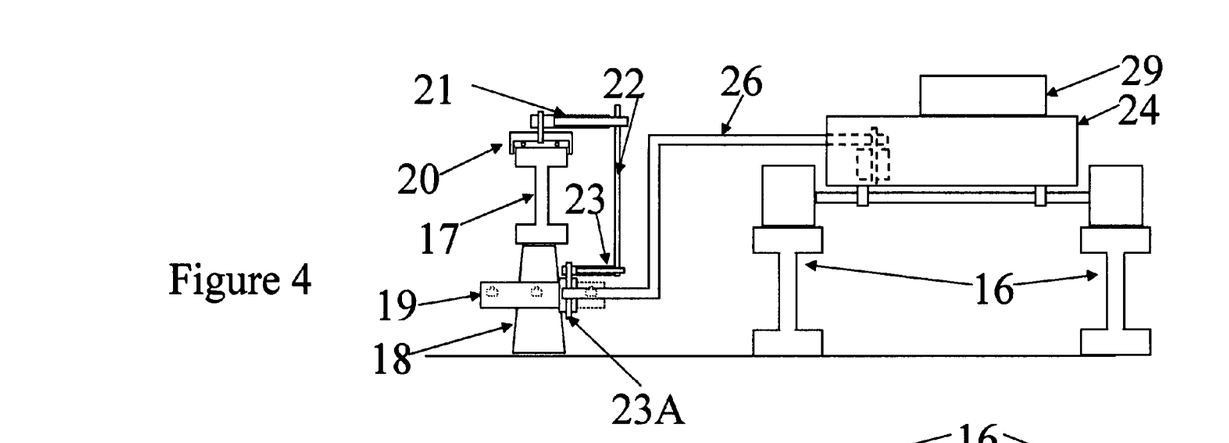
FIGS. 4 and 5 show a cross section of a vertical positioning assembly that holds the cleaning station at a fixed vertical plane with respect to the insulator.
Figure 5:
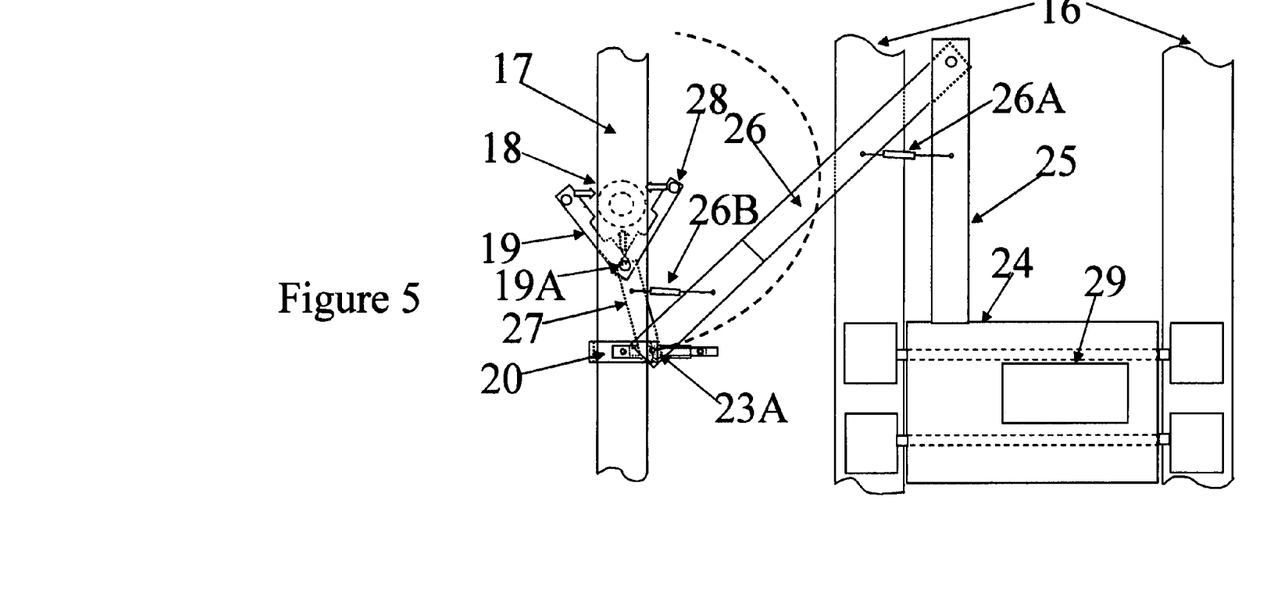

FIGS. 4 and 5 show a cross section of a vertical positioning assembly that holds the cleaning station comprised of fingers 19 and 28 connected by pin 19A at a fixed vertical plane with respect to the insulator. Skate 20 rides on top of the contact rail 17 and is connected via a fixed or telescopic arm 21 to the top of a vertical member 22. The lower end of member 22 is connected via a fixed or telescopic arm 23 to the pin 23A that links the articulated arm segments 26 and 27. Actuators 26A and 26B control the angular movement of said articulated arm and positioning of said head. The service vehicle contains a pressure washer, an engine driven or contact rail powered electric power source and an engine driven fluid compressor 29 connected to the cleaning tools.

FIG. 5 is a top view of the service vehicle 24 that rides on the running rails 16. Said articulated arm is connected by member 25 to the service vehicle 24. Said service vehicle contains a pressure washer, an engine driven or contact rail powered electric power source and an engine driven fluid compressor 29 connected to the cleaning tools.

Figure 6:
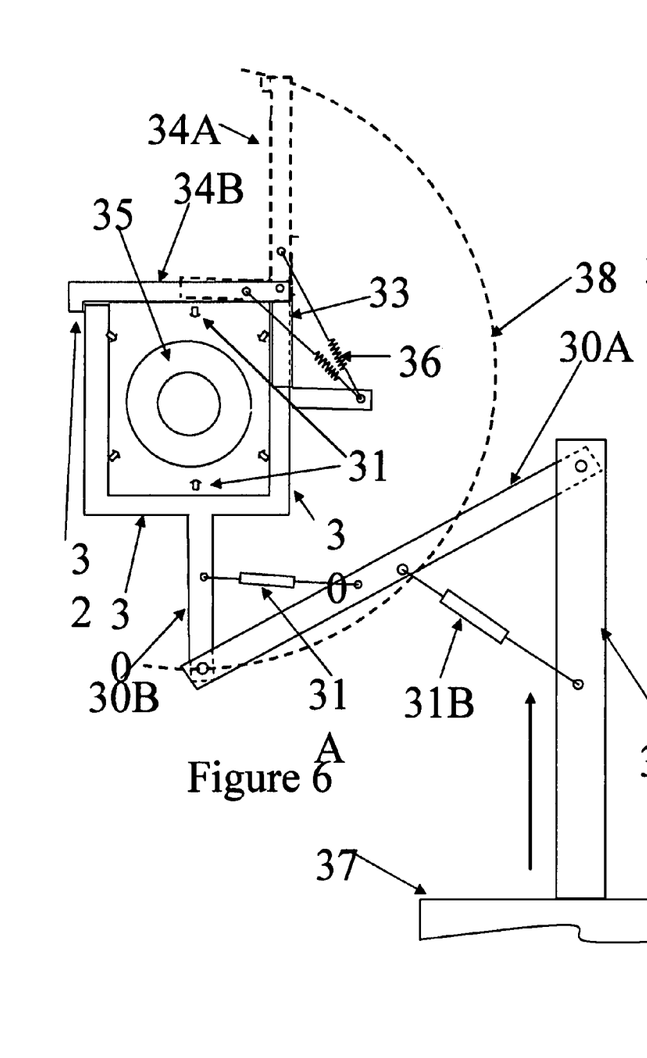
FIG. 6 is a top view of a U-shaped cleaning station 30, which can have several cleaning tools 31. A swivel lock is located at one end of a finger of said U-shaped cleaning station.

FIG. 6 is a top view of a U-shaped cleaning station 30, which can have several cleaning tools 31 such as stationary high pressure water jets or spray bars, spinning high pressure water jet nozzles or spray bars, and/or spinning brushes at various points around the insulator. Said station is connected by articulated arm members 30A and 30B to member 37A that is attached to service vehicle 37. Actuators 31A and 31B control the angular movement of said articulated arm and positioning of said head. A swivel lock is located at one end of a finger of said U-shaped cleaning station. Said swivel lock has two arms 33 and 34 (positions A and B) that can rotate to either an open position 34A or closed position 34B and lock said cleaning station around the insulator 35. If the cleaning tools are water jets, the reaction force of said water jets holds said cleaning head in engagement position as it rotates around said insulator.

Figures 7, 8:
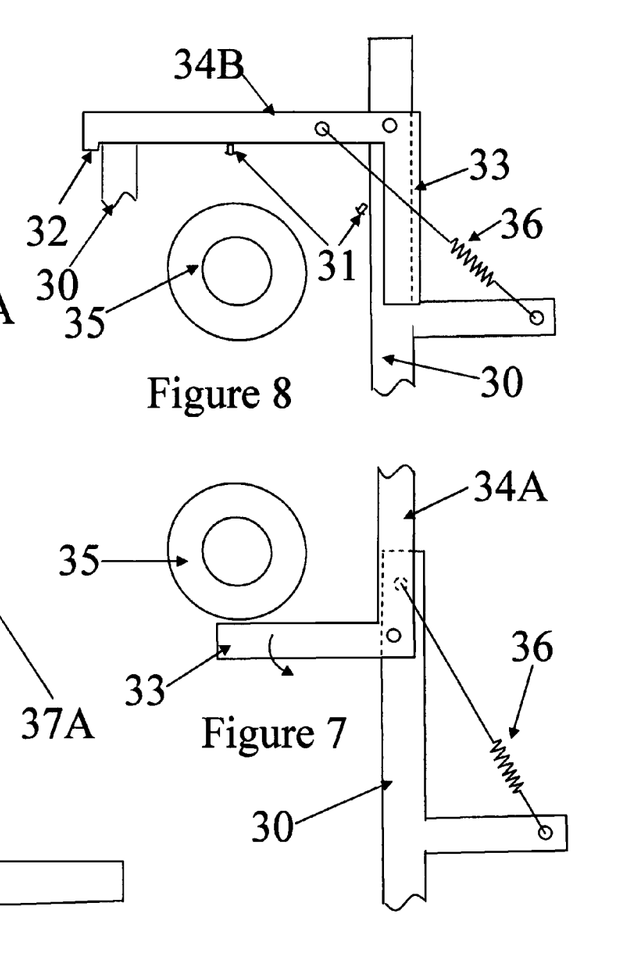
FIG. 7 shows a detailed view of the swivel lock with arm 34 in the open position 34A and arm 33 about to contact the insulator 35.
FIG. 8. shows the service the swivel lock arm 34 into the locked position 34B.

FIG. 7 shows a detailed view of the swivel lock with arm 34 in the open position 34A and arm 33 about to contact the insulator 35. As the service vehicle 37 moves forward (upwards in the Figure), the swivel lock arm 33 is pushed counterclockwise, and the spring 36 snaps arm 34 into the locked position 34B shown in FIG. 8. The tip of said arm 34 has a hook 32 that holds said arm to the end of the opposite finger of said cleaning head. As the service vehicle continues moving forward, said arm 34 prevents the cleaning station 30 from disengaging from said insulator. Said cleaning station 30 rotates almost 180 degrees counter clockwise around the insulator 35. As the service vehicle continues moving forward, the swivel lock arm in position 34B is pulled by contact with the insulator and snaps clockwise into the open position 34A The cleaning station releases the insulator and is ready to engage the next insulator.

Figure 9:
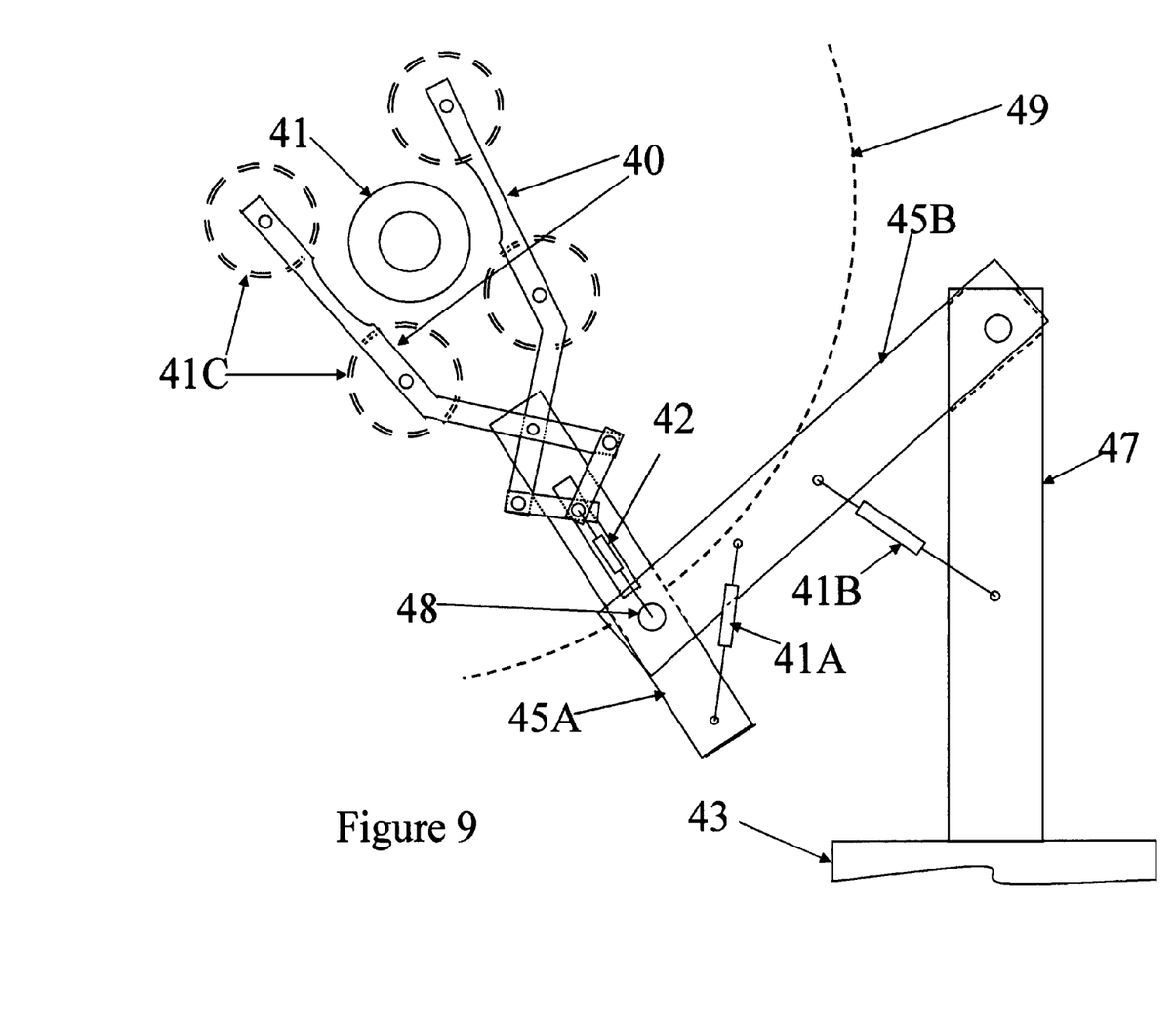
FIG. 9 shows the top view of a scissors type of cleaning station 40 embracing an insulator 41.

FIG. 9 shows the top view of a scissors type of cleaning station 40 embracing an insulator 41. Said station is connected by articulated arm members 45A and 45B to member 47 that is attached to service vehicle 43. Actuators 41A and 41B control the angular movement of said articulated arm and positioning of said head. Said service vehicle contains a pressure washer, an engine driven or contact rail powered electric power source and an engine driven fluid compressor connected to the cleaning tools 41C. Actuator 42 controls the opening and closing of the fingers 40. Said actuators can be manual, mechanical spring linkage or motor driven, fluid, electronic, electromagnetic, laser or laser scanner or computer controlled. As the service vehicle 43 moves forward, the fingers of the cleaning station are opened and surround the round insulator 41 and then closed by said actuator 42. As the service vehicle continues moving forward, the cleaning station rotates approximately 180 degrees counter clockwise around the insulator. The cleaning station is eventually pulled off said insulator and is ready to engage the next insulator.

Figure 10:
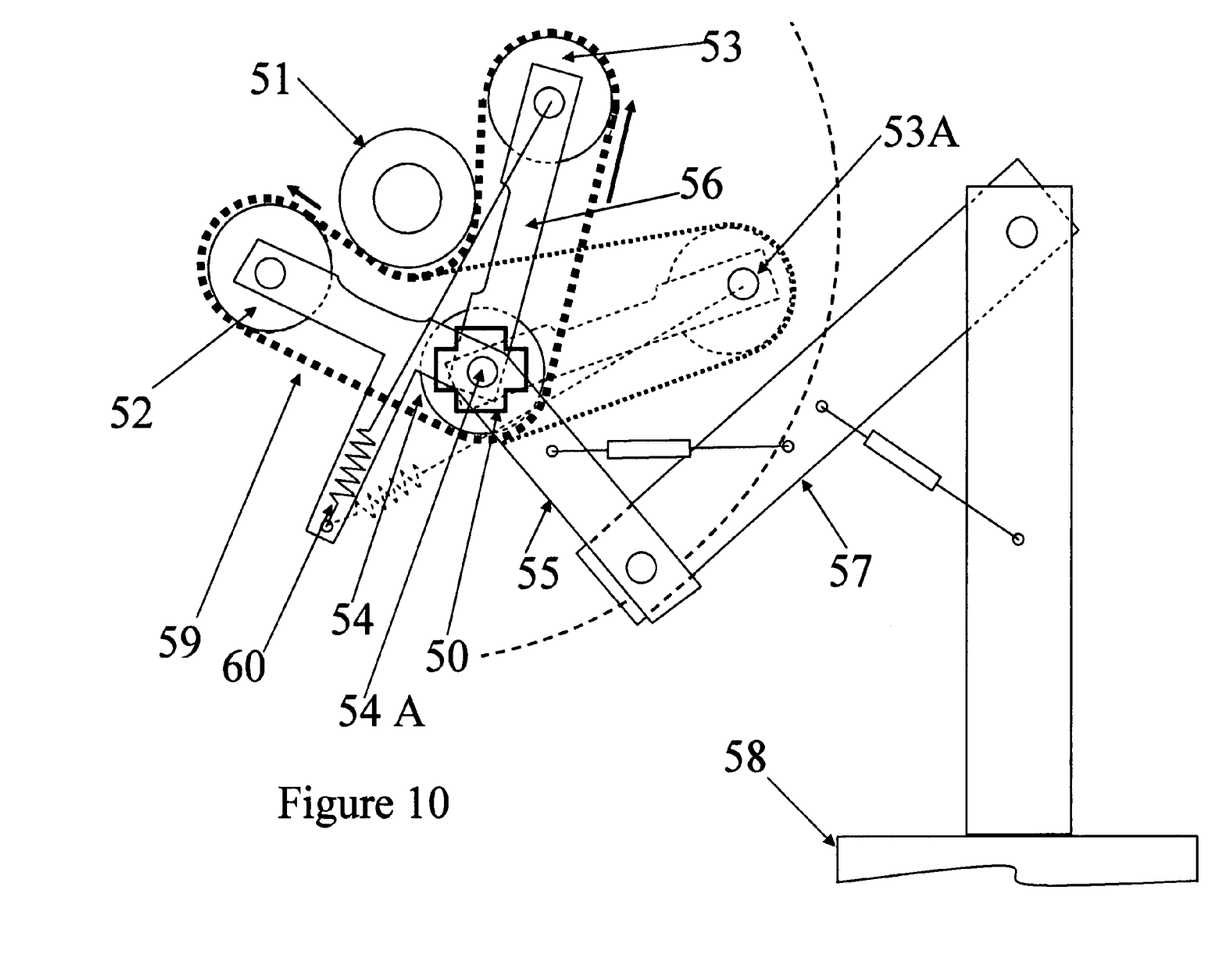
FIG. 10 shows a cleaning station with a cleaning belt (59) contacting the surface of insulator (51) over an arc of over 180 degrees.

FIG. 10 shows a cleaning station with a cleaning belt (59) contacting the surface of insulator (51) over an arc of over 180 degrees. Said belt wraps over wheels (52), (53) and (54), any or all of which could be driven by fluid motors, an internal combustion engine, fuel cell or contact rail powered electric motor 50 mounted on arm 55 and connected by a belt or chain drive to wheel 54 or pneumatic, electric or hydraulic motors in the service vehicle and connected to the cleaning station by pipes, tubing or flexible hose, flexible drive shaft, belt drive or chain drive or human power. Spring (60) keeps said belt in tension and wheel 53 in an open position 53A when the service vehicle approaches the insulator 51. As the service vehicle 58 moves forward, said belt is pushed towards wheel 54 by contact with said insulator and wheel 53 is pulled counterclockwise by said belt and the spring 60 snaps wheel 53 into the closed position. The wheels 52, 53 and 54 are now locked around and grip the insulator 51 with the arc of the cleaning belt 59 pressed against the insulator. The cleaning belt is caused to move across the surface of the insulator by said driven wheels. As the service vehicle continues moving forward, the cleaning station revolves almost 180 degrees counter clockwise around the insulator. Eventually the insulator pushes the wheel 53 apart that snaps into the open position 53A. The cleaning station is now ready to engage the next insulator.

Figure 11:
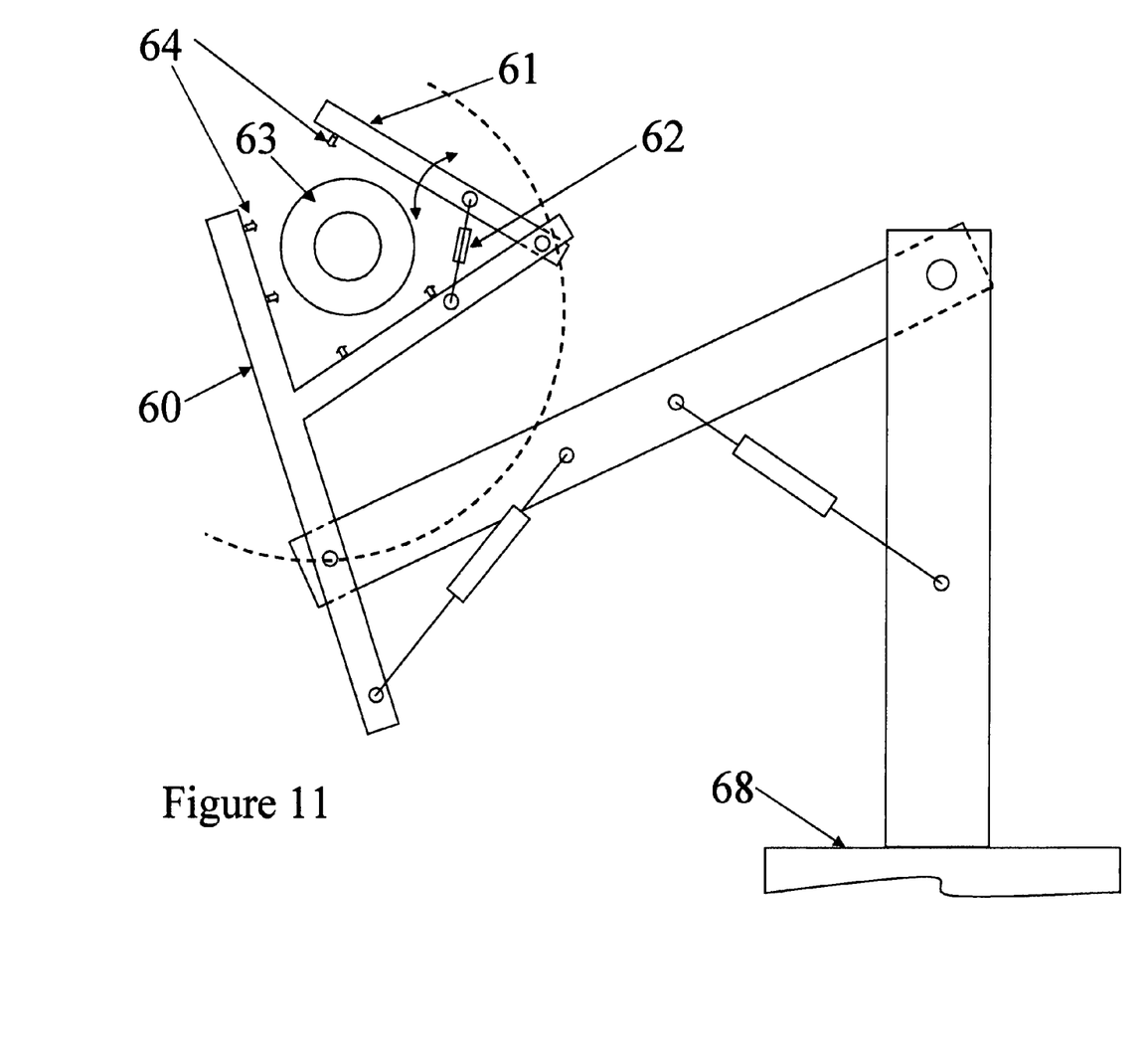
FIG. 11 shows a cleaning station 60 equipped with cleaning tools 64.

FIG. 11 shows a cleaning station 60 equipped with cleaning tools 64. Finger 61 is moved by actuator 62 that can be manual, mechanical spring linkage, fluid, electronic, electromagnetic, laser or laser scanner or computer controlled. When said finger 61 is locked around said insulator, cleaning tools 64 surround said insulator. As the service vehicle continues moving forward, said cleaning station revolves approximately 180 degrees counter clockwise around the insulator. Said actuator pulls finger 61 into the open position and the cleaning station releases the insulator. The cleaning station is now ready to engage the next insulator.

Figure 12:
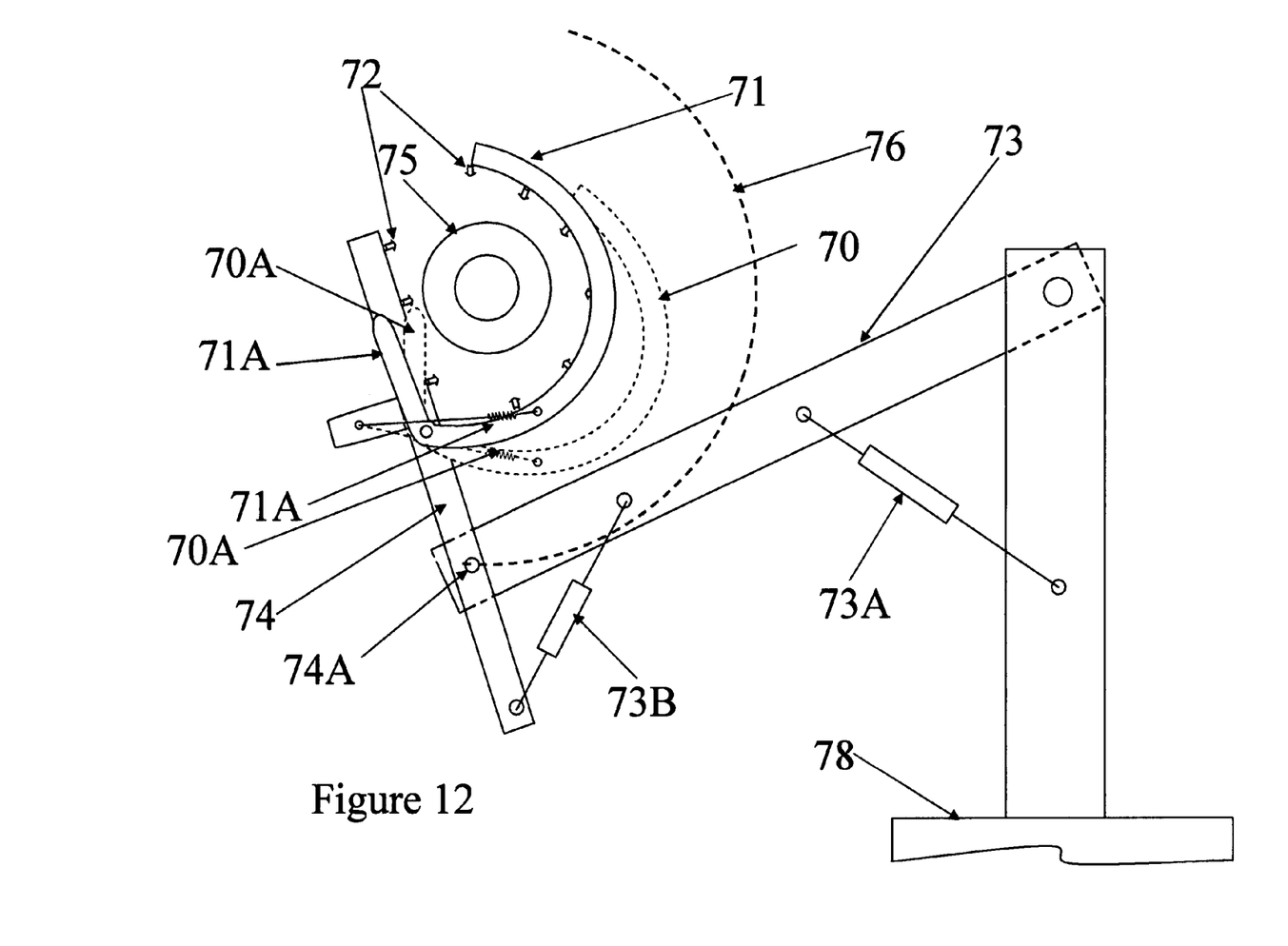
FIG. 12 shows a top view of a cleaning station with a movable sickle shaped finger 71.

FIG. 12 is a top view of a cleaning station with a movable sickle shaped finger 71 and a fixed finger which is the upper part of arm 74. The sickle shaped finger is shown in the open position 70. Said fingers can have several cleaning tools 72 at various points on said fingers to surround the insulator 75. As the service vehicle 78 moves forward, the lever 70A is pushed counterclockwise by contact with the insulator 75, and the spring 70A snaps the sickle into the closed position 71 around the insulator. Said movable finger 70 can also be moved by an actuator that replaces said spring 70A. Said actuator can be manual, mechanical spring linkage, fluid, electronic, electromagnetic, laser or laser scanner or computer controlled. As the service vehicle 78 continues moving forward, the cleaning station revolves almost 180 degrees counter clockwise around the insulator and pushes tip of said movable finger 71 which is caused to snap open by said spring 71A, or said actuator snaps said sickle shaped finger into the open position 70A, ready to engage the next insulator.

Figure 13:
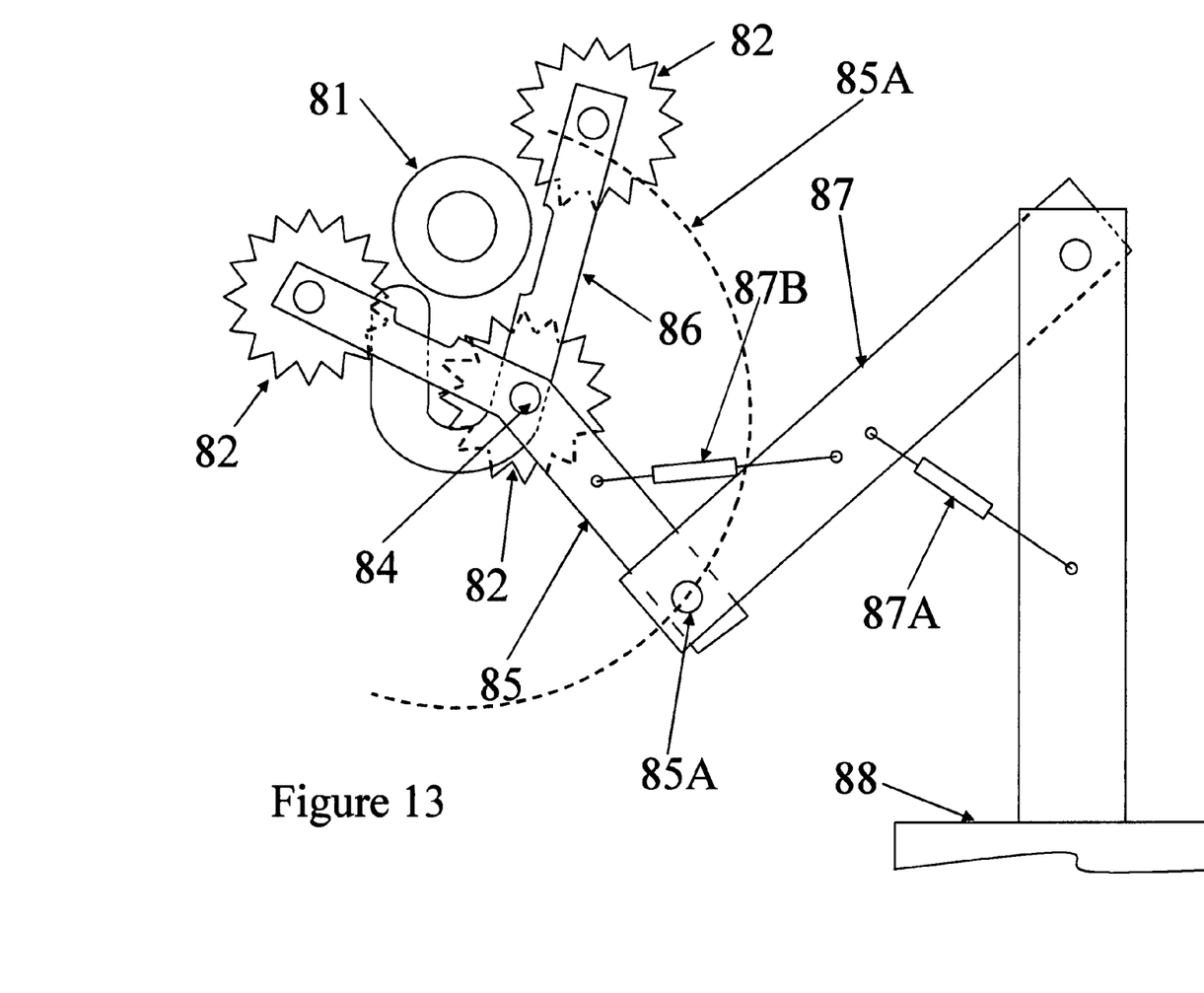
FIG. 13 shows a top view of a cleaning station with two fingers one of which is shaped like a hook that snags the insulator.

FIG. 13 shows a top view of a cleaning station with two fingers 85 and 86, hinged by pin 84 in the open position, and positioning arm 87 as it approaches insulator 81. The base of Finger 86 is shaped like a hook that snags the insulator and keeps cleaning point 84 pressed against the insulator as all three cleaning tools, 82 are pulled around said insulator by said arm 87 due to the forward movement of service vehicle 88.

Figure 14:
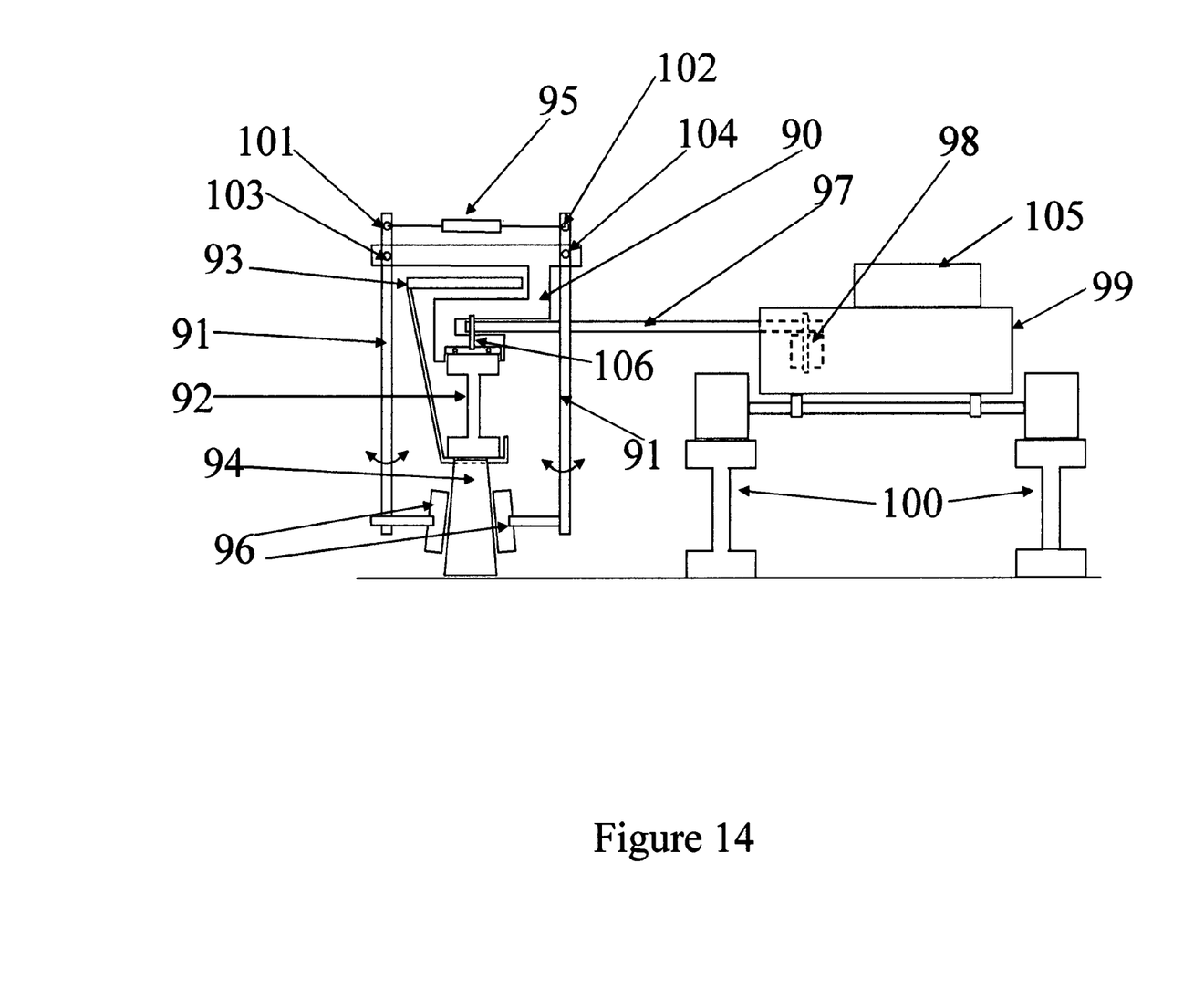
FIGS. 14 and 15 show a cross section view of a cleaning station 90 that rides on the contact rail 92.
Figure 15:
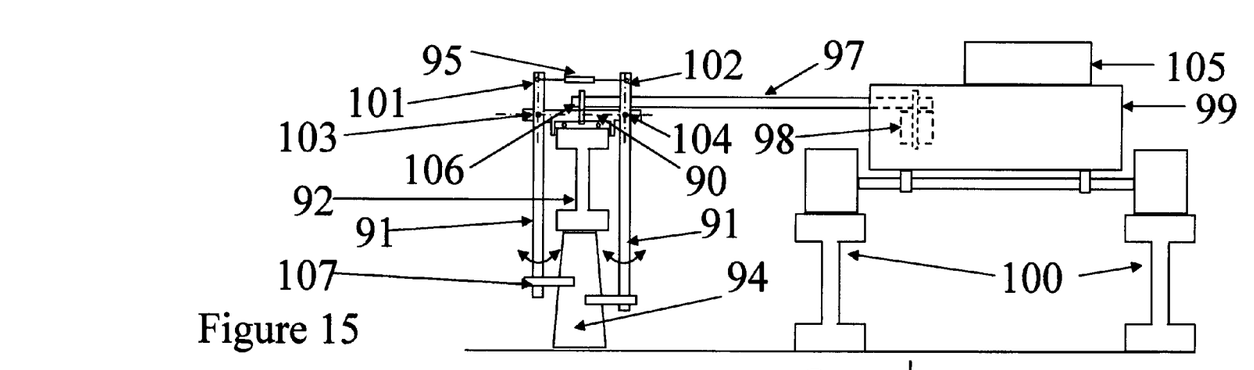
Figure 16:
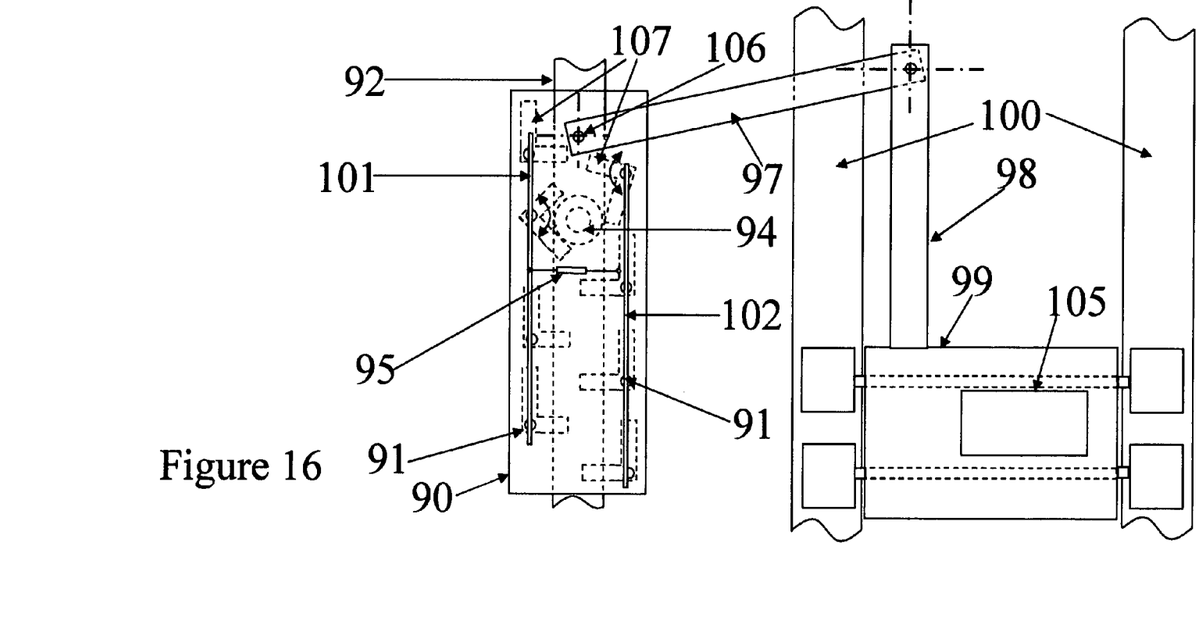
FIG. 16 shows a top view of the cleaning station 90 that rides on the contact rail 92.

FIGS. 14, 15 and 16 show a cleaning station 90 that rides on the contact rail 92, and is pulled by positioning arm 97 attached by member 98 to service vehicle 99 that travels on running rails 100. Said arm 97 also maintains the position of said cleaning station with respect to the plane of said running rails and keeps said station from tipping over. The pressure washer or water jet pump, water tank, air compressor, hydraulic pump and/or electricity generator 105, are located in said service vehicle.

FIG. 14 shows a cross section view of a cleaning station where the contact rail 92 is covered by a safety cover board 93 attached to the bottom of said contact rail. Said cover board can be attached to the top or bottom of said contact rail or to the bottom of the insulator 94. Cleaning station 90 slides or rolls over contact rail 92 and extends out above the top of said cover board. Said cleaning station has two rows of fingers 91 that are connected to the cleaning station by hinges 103 and 104. Said fingers hang down on either side of said contact rail 92. Cleaning tools 96 such as stationary high pressure water jets or spray bars, spinning high pressure water jet nozzles or spray bars, pneumatic polishing nozzles (a modified form of blast cleaning) and/or spinning or linear brushes are attached near the bottoms of the fingers so they are between the top and bottom of insulator 94. One tool could clean the top part of said insulator; the following tool could clean the lower part of said insulator and so on. Pairs of said cleaning tools can also be attached to the tips of L shaped tool holders 107 that swivel at the lower ends of the fingers. Said cleaning tool pairs and swivels can also be stacked vertically above each other at the base of a finger, from the plane of the lower part to the upper part of the insulator. The stand off distance can be maintained by the vertical placement of the swivels to follow the cross sectional shape of said insulator, be it cylindrical, or conical. Said pairs of said cleaning tools are pivoted in a horizontal plane at the base of the fingers and cover the outside surface of the insulator as they pass over it. Said cleaning tools are oriented by a mechanical spring loaded lever or button, contact with the insulator surface, proximity switch, infrared camera that senses heat from a dirty insulator, a laser or laser scanner, ultrasonic, human operator or other sensing means.

FIG. 15 is similar to FIG. 14 except that the contact rail is not covered by a safety board, or the safety board is supported by a bracket below the insulator.

FIG. 16 shows a top view of the cleaning station 90 that rides on the contact rail 92, and is pulled by positioning arm 97 attached by member 98 to service vehicle 99 that travels on running rails 100. Pairs of tools are attached to L shaped tool holders that can swivel, on either side of the insulator. The pairs of tools on said L shaped swivels on each side of the contact rail follow and clean that half of the curved surface of the insulator. The leading part of the L shape is parallel to the contact rail. The trailing part of the L shape is at 90 degrees to the contact rail and can touch said insulator. As said cleaning station moves forward, it causes the L shape to swivel around the insulator covering one half of the circumference of the insulator. The L shaped swivels can be staggered at different heights with respect to the insulator to maintain stand off distance for a non cylindrical insulator and at different positions along the length of the skate. The top parts of each of the two rows of fingers above both edges of the cleaning head are connected by horizontal members 101 and 102 that are parallel to the edge of the cleaning station. Said horizontal members can be moved towards each other by actuator 95, causing the tools at the ends of said fingers to move up and away from insulator 94, allowing the stand off distance to be adjusted and the cleaning station to be placed on or removed from the contact rail. The fingers can also be moved up and out of the way of obstructions near insulators such as anchors and cables.

DETAILED DESCRIPTION OF THE INVENTION

The device of the invention uses a positioning arm, preferably an articulated arm with at least two members connected by a hinge or pin to connect a service vehicle to a cleaning station. The cleaning station is connected to one end of the articulated arm with a hinge or pin so that it is capable of angular movement along a vertical axis around the insulator. The cleaning station has one or more fingers, which may be fixed or movable, that contact the insulator and bring the cleaning tools attached to the one or more fingers into operative proximity to the insulator. The one or more fingers may form a locking mechanism as in FIG. 9 that embraces the insulator.

There are several types of cleaning stations, with attached cleaning tools such as powered rotating, reciprocating, vibrating, oscillating and/or linear brushes, wrap around cleaning belts, sonic horns, ultrasonic vibrating guns, laser or laser scanners, pressure washing and/or water jetting nozzles on stationary, rotating or oscillating spray bars and spinning heads using steam, tap or deionized water, and pneumatic polishing nozzles (a modified form of blast cleaning that uses cleaning media at a low velocity) with particulate media. The positioning arm can be put in position by such positioning means as contact with the round insulator itself, or by mechanical linkages or fluid or fluid power, electronic or electromagnetic actuators controlled by a computer, mechanical lever or button, proximity switch, photo electric beam, infrared camera that senses heat from a dirty insulator, a laser or laser scanner, acoustic, sonic, ultrasonic, inductive, capacitance detector, human operator or other sensing means. The cleaning station tools are controlled by control means that may be selected from the same group of means as the positioning means. The finger(s) of the cleaning station may be controlled by contact with the insulator itself or by control means such as mechanical linkages, lever(s) or button(s) operated by contact with the insulator, proximity switch, infrared camera that senses heat from a dirty insulator, a laser or laser scanner, acoustic, sonic, ultrasonic, inductive, capacitance detector, human operator or other sensing means.

The cleaning station can be vertically positioned so that it straddles and slides or travels on rollers on top of the contact rail. The said cleaning station is pinned to a member such as a fixed or telescopic boom that swivels in a horizontal plane on top of the contact rail. The top end of a vertical member is attached to the end of the fixed or telescopic boom, and the bottom end is fixed to a lower member (e.g., fixed or telescopic boom) that swivels in a horizontal plane below the contact rail. The opposite end of the lower member is attached to the pivot point where the articulated arm is hinged to said cleaning station. In another embodiment of the invention, one arm of a U shaped member is attached to the cleaning station. The other arm of the U shaped member is vertically above the central point of the cleaning station and slides on top of the contact rail so that it acts like a hanger and vertically positions and supports the weight of the cleaning station as it revolves around the insulator.

There are several designs of cleaning stations that may be used in the invention. In one version, the said cleaning tools are attached to one or more moveable fingers held in said cleaning station that is attached to the end of said articulated arm. In another version, the cleaning station consists of a fixed U shaped member that has a movable locking mechanism such as an L shaped toggle at one tip of the U shaped member and that holds the station around the insulator to be cleaned. The closed toggle arm reaches across and hooks the other tip of the U shaped member. The closed toggle arm may also have cleaning tools attached to it. The said cleaning station can contain one or more of these cleaning tools; for example, it may contain both pressure washing nozzles and rotating brushes.

As the service vehicle moves along the track, the positioning arm brings the cleaning station close to the insulator. With different designs of the cleaning station, the finger(s) on which the cleaning tools are mounted may be fixed or movable with respect to the cleaning station. The finger(s) can be moved around the insulator by means of contact with the round insulator itself, or by mechanical linkages or fluid, electronic or electromagnetic actuators controlled by a mechanical lever or button, proximity switch, photo electric beam, infrared camera that senses heat from a dirty insulator, a laser or laser scanner, acoustic, sonic, ultrasonic, inductive, capacitance detector, human operator or other sensing means. Cleaning power to the cleaning tools can be continuous or automatically or manually switched on and off. Automatic switching of cleaning power can be provided by a mechanical switch, lever or button controlled by the opening of the fingers or with contact with the insulator or by said sensing means. Not energizing the cleaning tools when not in operative proximity with the insulator saves limited and valuable cleaning resources.

In an embodiment of the invention with movable finger(s), such as the one illustrated in FIG. 1 wherein finger (6) is movable, as the cleaning station approaches the insulator, to start the cleaning process, the fingers are in the open position and cleaning resource is off. When the cleaning station is in close proximity to the insulator, said fingers close around the insulator by means of said mechanical linkages or actuators and provide the cleaning action. The mechanical linkage may be spring loaded like a toggle, so that the finger(s) snap either open or closed around the insulator as illustrated in FIGS. 6-8. The finger or fingers have one or more cleaning tools attached to them and these are now energized and in close proximity to the surface of the insulator. The cleaning station is connected to the end of the articulated arm so that it is capable of angular movement along a vertical axis around the insulator. If the cleaning station has two or more fingers, the fingers may close when contacted by the insulator or when triggered by said sensing means, to embrace the insulator. As the service vehicle moves along the tracks near the insulator, the cleaning station stays in contact with the insulator, and is caused to revolve around it by the positioning arm fixed to said service vehicle. The revolution of the cleaning station around the insulator brings each cleaning tool into contact almost 180 degrees around the circumference of the insulator. Since the tools are separated by less than 180 degrees, the entire insulator surface is cleaned. As the service vehicle moves ahead, the fingers are moved apart as they are pulled off the insulator, either by the spring loaded mechanical toggle linkage or by said sensor(s) and actuators or human operator into the open position. The arm is returned to the ready position by said controls.

Cleaning brushes are made of non-conducting material. High pressure and temperature washing with tap or deionized water is provided with guards for overspray control. This reduces adverse effects of moisture such as causing electrical shorts in electrical sensors and switches or corrosion problems. Cleaning with steam and sonic horns is used as appropriate.

Pneumatic polishing or low pressure, high volume blast cleaning with an appropriate media is useful if the insulator has a non-uniform surface. A lightweight polishing/cleaning media is preferred that may provide a good scrubbing capability to remove dirt without being too abrasive. The polishing media should have a weight/air drag ratio that results in a low terminal velocity or "saltation point." The low air velocity is beneficial because it will not cause pitting, scratching, scuffing, or damage to the insulator surface. The polishing media is pneumatically conveyed by means of a blower or air compressor, and a vacuum nozzle picks up the used media. A push-pull system is anticipated so that the blower discharge provides the air supply for the polishing media, and the same blower intake provides the vacuum. The dirt and polishing media is retained in a filter housing on the intake side of the blower. The polishing media can be reused by separated it from the dirt by an air classification system or a cyclone.

Power is provided to the cleaning tools by a fuel cell or internal combustion engine, preferably, a diesel engine; or an electric motor energized by the contact rail or other electrical power source. The fuel cell, diesel engine or electric motor powers an air compressor, high temperature and pressure washer, and an electricity generator of suitable voltage or an inverter and transformer to provide electric power at a suitable voltage. These pieces of equipment along with water tanks are located in a service vehicle that runs on the rail tracks. Compressed air, high temperature hot water, motive power to spin brushes and/or electricity are transmitted to the cleaning station by means of piping with swivel connections, flexible hose, flexible shaft mechanical drives and/or wires that run through the articulated arm which is hollow or are attached to the outside of the articulated arm for one embodiment of the invention. Alternatively, the diesel engine or electric motor can be mounted next to the cleaning head and run mechanical cleaning tools such as rotating brushes or a wrap around cleaning belt by means of chain or belt drive and wheels, or fixed or flexible mechanical shaft drives.

Use of the cleaning device provides a means to clean dirty insulators quickly and at minimal cost. Some transit systems operate 24 hours a day, others shut down for about 3 hours at night, so time available for cleaning is limited. Also, it is preferred to clean on an energized system because turning the power off and on to the contact rail may take too much time, or may be difficult to do. In some systems with weak electric switchgear, it is preferred not to turn the power off because restoring the power is very problematic. The contact rail is energized in sectors. The power has to be turned off one sector at a time and the fuses removed for safety. This cuts down on the short timeframe available for cleaning the insulators.

The cleaning tools may need compressed air, high pressure water, electric or hydraulic power or mechanical power. Power is transmitted to the cleaning tools from the power source by compressed air lines, electric cords, chain, belt or flexible shaft drives, hydraulic lines and high pressure water tubing that are attached to the articulated arm. Alternatively, the power may be provided by a prime mover attached to the cleaning station itself.

The helicopter insulation cleaning system intended for cleaning insulators on overhead high voltage electric power distribution lines carried on towers described in U.S. Pat. No. 5,201,090 which utilizes a cleaning head with brushes; is far too slow for this application. Insulators on overhead power lines may be located hundreds of feet apart and it may be cost effective to have cleaning times of several minutes for each insulator. For cleaning rail rapid transit contact rail insulators, speed of cleaning is very important. Insulators are typically six to ten feet apart, and there are tens of thousands or hundreds of thousands to be cleaned. The proposed device should take a fraction of a minute to clean an insulator. The helicopter device hangs below the helicopter and it takes time to bring the helicopter into position with the next insulator because of the extreme danger involved due to proximity with power lines carrying several thousand volts. No helicopter is involved in this device.

The proposed cleaning device is attached to a service vehicle that runs on the fixed rails and has a positioning arm that quickly brings the cleaning station into precise proximity with the insulator; then it lets the cleaning station revolve around the insulator and disengages it and positions it ready for the next insulator that is typically six to ten feet away.

With reference to FIG. 1, the cleaning station of the invention comprises cleaning tools (2) and movable finger (6), attached to an articulated positioning arm comprised of members (5) and (7) by means of a hinged connection (11) that allows said cleaning station to turn in a vertical axis at the end of said positioning arm. The cleaning station is brought into close proximity to an insulator with said fingers in the open position, allowing said cleaning tools to embrace said insulator. As the vehicle (8) moves forward, said articulated arm causes the cleaning station to revolve around said insulator, thereby cleaning each insulator as the service vehicle travels on rail tracks parallel to contact rail with said insulators.

Power for the cleaning tools mounted on the fingers of the cleaning station may be compressed air for pneumatic polishing, steam, or high pressure and temperature tap or deionized water spray nozzles, electricity, mechanical transmissions such as wheels and belts or chains and sprockets, drive shafts or flexible shaft drives. Said vehicle may be equipped with an air compressor or hydraulic pump, air blower for drying washed insulators, electric generator, or inverter/transformers using power from the contact rail, steam generator or high pressure and temperature spray with tap or deionized water. Pneumatic polishing cleaning media, steam, or high pressure and temperature tap or deionized water spray and power may be conveyed from said vehicle to said cleaning tools by means of compressed air or hydraulic pipes or hoses, flexible shaft or shaft or wheel mechanical drive, or electric lines enclosed inside the hollow articulated arm or attached to outside of said arm. The cleaning station is disengaged and fingers on said cleaning station are opened by said sensing means when said station has revolved close to 180 degrees around said insulator. Finally, said cleaning station is return to the start position with said fingers in the open position ready to engage the next insulator as said service vehicle continues to move forward at a steady rate.

It is preferred to attach two cleaning devices near both corners of the front of said service vehicle and multiple devices spaced at both sides and the back of said vehicle, spaced so that several insulators on either side or both sides may be cleaned simultaneously, first with one method, such as high temperature and pressure water spray, then with a second method, such as cleaning with the wrap around cleaning belt or rotating brushes, followed by another high temperature and pressure water spray followed by a blow dry with heated air jets and finished off with brushes, sponges or spray jets that apply a dielectric coating containing an anti-stick material to keep the insulator functional for the long term.

In one embodiment, as shown in FIGS. 14, 15 and 16, the cleaning station rolls or slides on the contact rail. The cleaning station has pairs of fingers like an inverted U. The cleaning tools are at the tips of the fingers. The fingers can be moved up or down by an actuator so the cleaning station can be placed on or removed from the contact rail. The fingers can also be moved up to be out of the way of obstructions such as contact rail anchors and electric power cables. The fingers hang down on either side of the contact rail, and are attached to the base of the inverted U that extends over the contact rail cover board. The cleaning tools are positioned on opposite sides of the contact rail. Said cleaning tools are oriented by a mechanical spring loaded lever or button, proximity switch, infrared camera that senses heat from a dirty insulator, a laser or laser scanner, ultrasonic, human operator or other sensing means. The two cleaning tools are pivoted in a horizontal plane at the base of the fingers and cover the outside surface of the insulator as they pass over it.

FIG. 10 shows another embodiment wherein the cleaning station has a wrap around cleaning belt 59 that runs over two wheels 52 and 53, located at the tips of two fingers 55 and 56, and a wheel 54, located over the pivot point 54A where the two fingers meet in a V. Any or all of the wheels can be driven by a fluid or electric motor or internal combustion engine or fuel cell mounted on the cleaning head arm 55 or service vehicle 58 via mechanical drive, tubing or flexible hose. Said fingers are oriented and operated by a mechanical spring loaded lever, snap action toggle or button, proximity switch, infrared camera that senses heat from a dirty insulator, a laser or laser scanner, ultrasonic, manually operated levers, contact with the insulator 51, or other sensing means. The tips of said fingers are kept in an open V position by means of said actuator(s) and embrace the insulator when they are close to it. Said cleaning belt is wrapped around part of the insulator as said fingers embrace said insulator. Said motors drive the wheels and make the belt move around the insulator surface and clean it.

The invention also includes the entire cleaning system. The cleaning system comprises the motorized service vehicle that moves on the rail tracks, with air and fluid compressors, electric power supply, mechanical drive via fixed or flexible shaft, chain or belt drive, controlling the opening and closing the fingers by a mechanical lever or button operated by contact with the insulator or human operator, proximity switch, infrared camera(s) on one or both sides of the front end of said vehicle that senses heat from a dirty insulator, a laser or laser scanner, ultrasonic or other sensing means, and one or more positioning arms with attached cleaning stations at the front and sides of said vehicle. The motorized service vehicle may be a truck with wheels adapted to run on rails.

In one embodiment of the invention the contact rail is used as a support and guide way for a skate that supports a cleaning station. The skate is pulled by a service vehicle. The cleaning station has attached pairs of hinged vertical members suspended and hanging down from it on both sides of the contact rail, like an inverted U. Cleaning tools are attached to fingers on the bottom of the vertical members.

As shown in FIGS. 14 and 15, the invention also provides a device for cleaning contact rail insulators comprising a cleaning station with one or more pairs of fingers having cleaning tools, said cleaning station being mounted on a skate that rides on the contact rail. Said cleaning station is attached by an arm to a vehicle that travels on the running rails. Said cleaning station rides on the contact rail and has pairs of fingers, each pair being like an inverted U. The cleaning tools are at the tips of the fingers, adjacent to the insulators. The fingers can be opened and closed, like the wings of a bird, by an actuator so the cleaning station can be placed on or removed from the contact rail and avoid obstructions such as anchors and electric cables. One finger hangs down on one side of the contact rail. The other finger is attached to the base of the inverted U that extends over the contact rail cover board to position the cleaning tool on the opposite side of the contact rail. Said cleaning tools are oriented by a mechanical spring loaded lever or button, proximity switch, infrared camera that senses heat from a dirty insulator, a laser or laser scanner, ultrasonic, human operator or other sensing means. The cleaning tools are attached to an L shaped lever that pivots in a horizontal plane at the base of the fingers and cover the outside surface of the insulator as they pass over it.

The leading and succeeding pairs of fingers could have attached cleaning tools such as powered rotating, reciprocating, vibrating, oscillating and/or linear brushes, wrap around cleaning belts, sonic horns, ultrasonic vibrating guns, laser or laser scanners, pressure washing and/or water jetting nozzles on stationary, rotating or oscillating spray bars and spinning heads using steam, tap or deionized water, and pneumatic polishing nozzles (a modified form of blast cleaning that uses cleaning media at a low velocity) with particulate media. The last pair of fingers can have hot air nozzles to dry the insulators.

The invention includes the process of
(a) moving a vehicle having one or more cleaning stations with cleaning tools mounted on them, along a rail track adjacent to a parallel contact rail supported by electrical insulators, said cleaning stations being mounted on one or more positioning arms attached to said vehicle,
(b) placing said cleaning tools in operative proximity to an electrical insulator supporting said contact rail, while the cleaning station(s) rotate around at least a portion of the circumference of the insulator,
(c) energizing the cleaning tools when they are at the operative proximity with the insulator,
(d) disengaging the cleaning tools from the insulator, and
(e) returning the cleaning station to the engagement position.

The cleaning tools may be de-energized when disengaged from the insulator. The process may be finished off with brushes, sponges or spray jets that apply a dielectric coating containing an anti-stick material to keep the insulator functional for the long term.

I claim:

1. A process for cleaning electrical insulators supporting a contact rail parallel to a rail track comprising:
   (a) moving a vehicle having one or more cleaning stations with cleaning tools mounted on said cleaning stations, along a rail track adjacent to a parallel contact rail supported by electrical insulators, said cleaning stations being mounted on one or more positioning arms;
   (b) positioning said cleaning tools in proximity to an electrical insulator, while the cleaning stations rotate around at least a portion of the circumference of the insulator, wherein said cleaning stations have one or more fingers with cleaning tools mounted on said fingers, said cleaning station being attached to an articulated positioning arm by means of a hinged connection that allows said cleaning station to turn at the end of said positioning arm, and the positioning of the cleaning tools is brought about by embracing said insulators with said fingers;
   (c) energizing the cleaning tools;
   (d) disengaging the cleaning tools from the insulator; and
   (e) returning the cleaning station to the engagement position.

2. The process of claim 1 wherein said cleaning station has means for controlling said one or more fingers.

3. The process of claim 1 wherein said cleaning tools comprise one or more of powered rotating, reciprocating, vibrating, oscillating or linear brushes, wrap around cleaning belts, sonic horns, ultrasonic vibrating guns, laser or laser scanners, pressure washing nozzles, water jetting nozzles, and pneumatic polishing nozzles with particulate media.

4. The process of claim 1 wherein said cleaning tools comprise spinning heads using steam, tap or deionized water.

5. The process of claim 1 wherein disengaging the cleaning tool from the insulator is carried out by opening one or more movable fingers attached to said cleaning station and pulling the cleaning station away from the insulator.

6. The process of claim 1 wherein returning the cleaning station to the engagement position is carried out by actuating means for controlling the position of the cleaning station.

7. The process of claim 1 wherein the cleaning station rides on the contact rail.

8. The process of claim 7 wherein said cleaning station turns in a vertical axis.

9. The process of claim 1 wherein said electric insulators are mounted under said contact rail.

10. The process of claim 1 comprising applying a dielectric coating containing an anti-stick material with brushes, sponges or spray jets.

11. The process of claim 1 wherein said cleaning station rides on the contact rail and has vertical members with cleaning tools for cleaning insulators under the contact rail, said cleaning tools hanging to a level at which they are in operative proximity to said insulator.

12. The process of claim 11 wherein said cleaning tools are attached to fingers on the bottom of said vertical members.

13. The process of claim 11 wherein said cleaning station has an actuator to open and close said vertical members so that the cleaning station may be placed on and removed from said contact rail and so that the cleaning tools may be positioned at the proper distance from said insulator surface.

14. The process of claim 11 wherein said cleaning tools are attached to an L-shaped tool holder at the level of the insulator to be cleaned, said L-shaped tool holder being mounted so that it can rotate in a horizontal plane around a portion of the circumference of said insulator.

15. The process of claim 11 wherein said cleaning tools are attached to a U-shaped member at the level of the insulator to be cleaned, said U-shaped member being mounted so that it can rotate in a horizontal plane around a portion of the circumference of said insulator.

16. The process of claim 15 wherein said U-shaped member has a moveable locking mechanism at one tip of the U-shaped member.

17. A process for cleaning electrical insulators supporting a contact rail parallel to a rail track comprising:
   (a) moving a vehicle having a positioning arm, one end of said positioning arm being attached to said vehicle, the other end of said positioning arm being attached to one or more cleaning stations, along a rail track adjacent to a parallel contact rail supported by electrical insulators, said cleaning stations having vertical members with cleaning tools for cleaning insulators under the contact rail;
   (b) positioning said cleaning tools in proximity to an electrical insulator, while the cleaning tools rotate around at least a portion of the circumference of the insulator, wherein said cleaning stations have one or more fingers with cleaning tools mounted on said fingers, said cleaning station being attached to an articulated positioning arm by means of a hinged connection that allows said cleaning station to turn at the end of said positioning arm, and the positioning of the cleaning tools is brought about by embracing said insulators with said fingers;
   (c) energizing the cleaning tools;
   (d) disengaging the cleaning tools from the insulator; and
   (e) returning the cleaning station to the engagement position.

18. The process of claim 17 wherein said cleaning tools are mounted on an L-shaped tool holder.

19. The process of claim 17 wherein said cleaning tools are pressure washing or water jetting nozzles.

20. The process of claim 19 wherein said pressure washing or water jetting nozzles are attached to stationary, rotating or oscillating spray bars or spinning heads.

* * * * *